United States Patent [19]

Ikeda et al.

[11] 4,014,418
[45] Mar. 29, 1977

[54] TIRE WITH EMBEDDED CURRENT COLLECTOR

[75] Inventors: Ryo Ikeda; Toshihiko Hori, both of Hiratsuka; Susumu Nakamura, Tokyo, all of Japan

[73] Assignee: The Yokohama Rubber Co., Ltd., Tokyo, Japan

[22] Filed: Sept. 9, 1974

[21] Appl. No.: 504,494

[30] Foreign Application Priority Data

Sept. 11, 1973  Japan ............................. 48-101690
Aug. 19, 1974  Japan ............................. 49-94863

[52] U.S. Cl. ............................................. 191/45 R
[51] Int. Cl.² ............................................. B60L 5/38
[58] Field of Search ........... 152/209 R, 330 R, 153, 152/361 R, DIG. 2; 191/1 R, 45 R, 57, 63

[56] References Cited

UNITED STATES PATENTS

| | | | |
|---|---|---|---|
| 1,859,343 | 5/1932 | Rouge | 191/1 R |
| 1,956,739 | 5/1934 | Gollert | 152/153 |
| 2,686,891 | 8/1954 | Burgin | 191/1 R |
| 3,016,024 | 1/1962 | Silver | 191/57 |
| 3,735,790 | 5/1973 | Bertrand | 152/361 R |

Primary Examiner—Stanley H. Tollberg
Attorney, Agent, or Firm—Oldham & Oldham Co.

[57] ABSTRACT

A current-collecting elastic tire for a vehicle in which a plurality of electrodes of conductive material are continuously or discontinuously embedded in the tire body in the circumferential direction of the tire tread portion, and these electrodes are exposed at one end thereof from the tire tread surface and connected electrically at the other end thereof to the vehicle by electrical wiring so that external electric current can be collected by the tire.

2 Claims, 10 Drawing Figures

TIRE WITH EMBEDDED CURRENT COLLECTOR

BACKGROUND OF THE INVENTION

This invention relates to a current-collecting elastic tire for a vehicle, and contemplates the provision of a tire of the kind above described in which electrodes are embedded in the tread portion of the tire body to be exposed at one end thereof from the tire tread surface and electrically connected at the other end thereof to the vehicle by electrical wiring. Further the present invention contemplates the provision of a tire of the above character, which collects current while making rolling movement and has a longer service life than that of prior art current collectors of the type adapted for collecting current by frictional sliding engagement due to the fact that less friction is encountered during collection of current.

Vehicles driven by electric power, for example, electric cars, trolley buses, subway cars, etc. collect current from an associated exclusive power supply line by a special current collector such as a pantograph. Vehicles relatively recently developed as transportation means in a city traffic system, such as monorail cars and PRT cars (Personal Rapid Transit System) which run on a track laid exclusively therefor, and provided with auxiliary guide wheels besides the main wheels which support the load of the vehicle body. When these vehicles are driven by electric power, a current collecting means of a form similar to the previous combination of a power supply line and a pantograph is still employed therein.

A vehicle guiding equipment is provided exclusively for the vehicles used as the transportation means in such a city traffic system. Therefore, utilization of this vehicle guiding equipment as a path of electric power supplied to the vehicles can greatly reduce the required materials and costs. However, mere utilization of this vehicle guiding equipment as a path for electric power supply cannot in any way attain a remarkable progress over the prior art technique inasmuch as a special current collector of the kind similar to the prior art one is employed still to collect current from such a power supply path. It is therefore desirable that the tire itself of the guide wheel serves also as a current collector, but no tire capable of collecting current has been proposed hitherto. A wheel of good electrical conductor or a metal wheel may be employed as this guide wheel, but such wheel is defective in that it is devoid of the high elasticity of rubber tires.

Further, a conventional tire is an electrical insulator in itself due to the fact that it is composed essentially of tire cords reinforcing the tire structure and a mass of rubber for protecting the tire cords. Electrodes may be embedded in such a tire so that the tire can collect current. A method previously commonly employed for forming a rubber tire comprises bonding together on a cylindrical tire molding drum a plurality of carcass members formed by covering the tire reinforcing layers of tire cords with rubber, bonding layers of rubbers for forming the tread and side cover layers of the tire, and placing the cylindrical semi-finished unvulcanized tire in a vulcanizing press to shape the unvulcanized tire in a form of a solid torus and to vulcanize the unvulcanized tire for obtaining a predetermined tire configuration. Thus, according to the prior art method, it has been a matter of extreme difficulty to accurately embed desired electrodes and electrical wiring (power supply conductors) in predetermined positions. Such difficulty may be overcome by previously embedding electrical wiring within the tire walls and driving metal pieces analogous to ice spikes into the vulcanized tire to provide the desired electrodes. However, another difficulty arises in respect to the manner of electrical connection between the electrodes and the electrical wiring, and an additional problem arises with respect to the mechanical strength, etc. of the tire since these electrodes are not previously disposed in the tire during molding but are mechanically driven into the shaped tire.

A technique of making a tire by casting an elastomer in liquid state has been recently developed. This cast tire is made by pouring an elastomer in liquid state into a space of tire configuration defined between a tire mold forming the external shape of the tire and an internal mold forming the internal shape of the tire, and curing the elastomer to obtain the desired tire. When, for example, polyurethane rubber is used as this elastomer, the molded article thus obtained has a high tensile strength, a great resistance to wear and a high rigidity compared with conventional molded articles of rubber. Therefore, it has become able to obtain a tire which can sufficiently withstand servere uses without requiring any reinforcing members or tire cords commonly employed in prior art tires. The development of this unique cast tire technique has enabled to easily obtain a tire having electrodes and electrical wiring embedded therein.

SUMMARY OF THE INVENTION

It is a primary object of the present invention to provide a novel tire structure in which current-collecting electrodes are embedded in the tire body so that current can be collected by the tire itself. The present invention is especially suitable for application to a guide wheel of a vehicle which requires a guideway.

In accordance with the present invention, there is provided a current-collecting elastic tire for a vehicle comprising a plurality of electrodes of conductive material embedded continuously or discontinuously in the tire body in the circumferential direction of the tire tread portion, said electrodes being exposed at one end thereof from the tire tread surface and electrically connected at the other end thereof to a suitable portion of the vehicle by electrical wiring. The term "electrodes discontinuously embedded" is used herein to indicate such an electrode arrangement in which at least one of the electrodes embedded in the tire used in the vehicle is in electrical contact with a guideway which serves as a path of electric power supplied to the vehicle.

The structure of the current-collecting elastic tire according to the present invention will be described. The tire body consists of a single mass of a relatively rigid elastomer such as polyurethane rubber having a high tensile strength and a high modulus of elasticity and is not provided with a reinforcing member such as a tire cord carcass layer employed in conventional pneumatic tires. Further, unlike the conventional pneumatic tire in which the air under pressure is utilized for maintaining the shape thereof, the tire body of the present invention formed by the relatively rigid elastomer maintains the shape thereof and supports the load by the rigidity of the material forming the tire body. Therefore, the tire of the present invention is substantially free from the loss of the tire function which is frequently encountered by the conventional pneumatic tire due to leakage of air under pressure. That is, the tire of the present invention is substantially free from puncture. The tire of the present invention can be constructed so that the spring constant in the radial direction and various other properties thereof are of the same levels as those of the conventional pneumatic tire.

The tire having such features is provided with electrodes of a good conductor of electricity such as copper, aluminum, zinc, carbon or their alloy embedded continuously or discontinuously in the circumferential direction of the tire tread portion, and electrical wiring connected to these electrodes extends through the tire body to a predetermined position in the tire bead portion and thence through the rim to be electrically connected to a suitable portion of the vehicle so that electric power can be supplied to the vehicle by the tire running with the vehicle while making rolling engagement with the guideway. Thus, any especial current collector such as a pantograph used in electric cars, monorail cars or subway cars is unnecessary, and the exclusive track or guideway for the tire can serve also as the power supply path thereby greatly simplifying the structure of the equipment and power supplying and current collecting system. Further, the tire which collects current by rolling engagement provides a great economical advantage in that its service life can be extended to several times that of the pantograph which collects current by frictional sliding engagement.

Generally, a guide wheel required for a vehicle is designed to be as small in size as possible in view of the special use thereof and is arranged to run in a recess such as a side groove of a track. It is strongly demanded for the tire in such a guide wheel that it can be maintained with the least man power, and in this respect, a pneumatic tire is disadvantageous in that it needs frequent checks for the control and maintenance of proper air pressure and for preventing undesirable puncture. In the tire according to the present invention, a relatively rigid elastomeric material is used to support the tire configuration and load in lieu of the carcass layers employed in conventional pneumatic tires, and electrodes connected to electrical wiring are continuously or discontinuously embedded in the tire body in the circumferential direction of the tire tread portion. It is apparent that this tire functions as a new and valuable vehicle guiding means. Further, the electrical wiring connected to the electrodes in the tire tread portion may be extended into the internal cavity of the tire body and slip rings may be disposed in this internal cavity to conduct electric power to the axle of the vehicle. This arrangement is effective in that frictional sounds produced by the slip rings can be greatly attenuated to a level far lower than the noise level of a conventional current collector such as a pantograph making frictional sliding engagement for current collection, due to the fact that the slip rings are confined within the tire body.

Further, the rolling current collector such as the current-collecting tire of the present invention is advantageous in that flatness of high precision required for a conventional power supply path is unnecessary. Since the guideway engaging surface of such a tire absorbs slight irregularities of the guideway serving as the power supply path and is in continuous electrical engagement with the guideway, no sparks are generated and damage to the power supplying and current collecting system can be avoided. Furthermore, any especial dimensional precision is not required for the guideway which provides the power supply path, and the precision of the order commonly required for roads is sufficient to meet the requirement. Furthermore, the electrodes may be divided into two or more groups embedded in parallel with one another in the tire tread portion and may be brought into simultaneous engagement with two or more power supply paths of different kinds so as to constitute two or more power supplying and current collecting circuits.

Moreover, the conductors forming the electrical wiring connected to one end of the electrodes in the tire of the present invention may be arranged in a large number like the conventional cords of the tire carcass layer so that these conductors can form a tire reinforcing layer similar to the conventional tire carcass layer. In such a case, the elastomeric material forming the tire may not necessarily be rigid and may have a rigidity similar to that of rubber used in conventional pneumatic tires. Air under pressure may be charged into this tire when it is desired to use this tire as a pneumatic tire. In this case, the tire of the present invention operates as a pneumatic tire and yet can collect current.

The tire according to the present invention has many features and advantages as above described. Some preferred embodiments of the present invention will now be described with reference to the accompanying drawings.

DETAILED DESCRIPTION OF THE PREFERRED EMBODIMENTS

Figure 1:
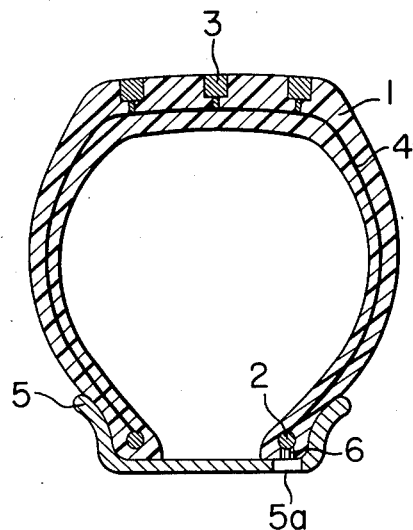
FIG. 1 is a schematic sectional view of an embodiment of the current-collecting tire according to the present invention.

Referring to FIG. 1, an embodiment of the tire according to the present invention comprises a tire body 1 of elastomeric material, a bead wire 2 disposed in the tire body 1, a plurality of electrodes 3 disposed continuously (or in an annular form) in the tire body 1 in the circumferential direction of the tire tread portion so as to be partly exposed from the tire tread surface, an electrical wiring network 4 connected to the electrodes 3 for supplying electric power to a predetermined portion of a vehicle, a tire rim portion 5, an electrical wiring 6, and an opening 5a bored in the rim 5 for passing the power supply leads therethrough.

The elastomeric material forming the tire body 1 may be any suitable material which provides desired durability. This elastomeric material is selected from the group consisting of natural rubbers, synthetic rubbers and synthetic resins. For instance, a polyurethane elastomer consisting of 100 parts of Colonate 4095 (Trade Name) made by Nippon Polyurethane Co., Ltd. and 15 parts of Pandex E (Trade Name) made by Dai-Nippon Ink, Co., Ltd. is one of the elastomeric materials which give the desired basic property of a tire without resorting to air pressure. This polyurethane elastomer is relatively rigid and has a hardness of about 95° according to the hardness standard of JIS Japanese Industrial Standards).

A spring constant in the radial direction of a conventional pneumatic tire which is of the order of 20 kg/mm in the case of a passenger car tire and 90 to 100 kg/mm in the case of a truck or bus tire and an endurance running performance equivalent to that of such pneumatic tires can be easily obtained by the tire molded from this polyurethane elastomer. Further, an elastomeric material having a JIS hardness of about 70 may be used to form the tire body. In this case, the wall thickness of the tire is adjusted to provide a total elastic modulus equal to that of a conventional pneumatic tire so as to obtain a spring constant in the radial direction substantially equivalent to that of the pneumatic tire. Furthermore, the conductors forming the electrical wiring network 4 may be uniformly arranged in a high density to provide a layer similar to the conventional carcass layer as required. The tire of such a construction does not expand like a balloon and maintains the configuration of the tire even when air pressure is introduced into the internal cavity, and a spring constant in the radial direction and an endurance running performance equivalent to those of a conventional penumatic tire can be easily obtained.

The electrodes 3 may be of any suitable material which is a good electrical conductor. The material of the electrodes 3 is suitably selected from, for example, the group consisting of copper, aluminum, carbon and their alloys in relation with the material of the tire body.

Although the electrodes 3 are shown in FIG. 1 as three annular or band-like electrodes which are continuous in the circumferential direction of the tire tread portion, these electrodes 3 may be discontinuously disposed, and employment of this discontinuous electrode arrangement is rather preferable in many cases from the standpoint of the tire property as described later.

Figure 2:
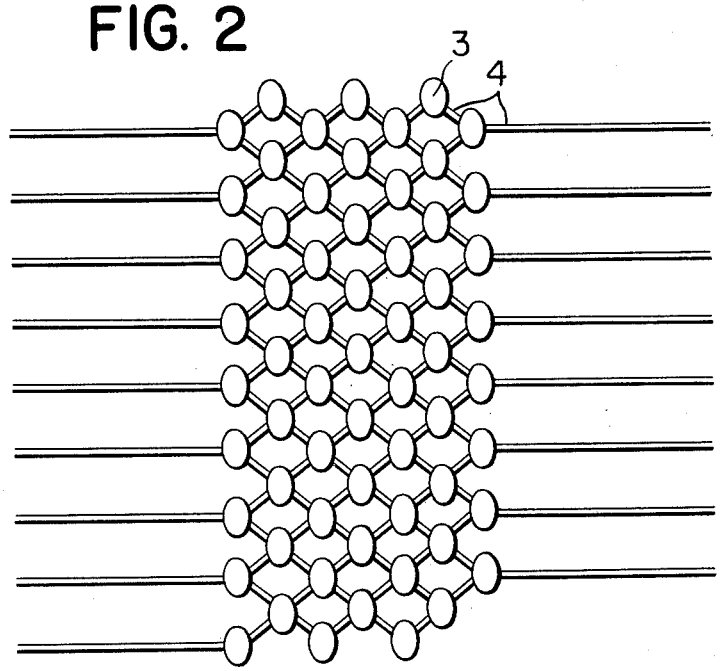
FIGS. 2, 3, and 4 are diagrammatic plan views showing in developed fashion various manners of electrical connection between electrodes and electrical wiring in other embodiments of the tire according to the present invention.
Figure 3:
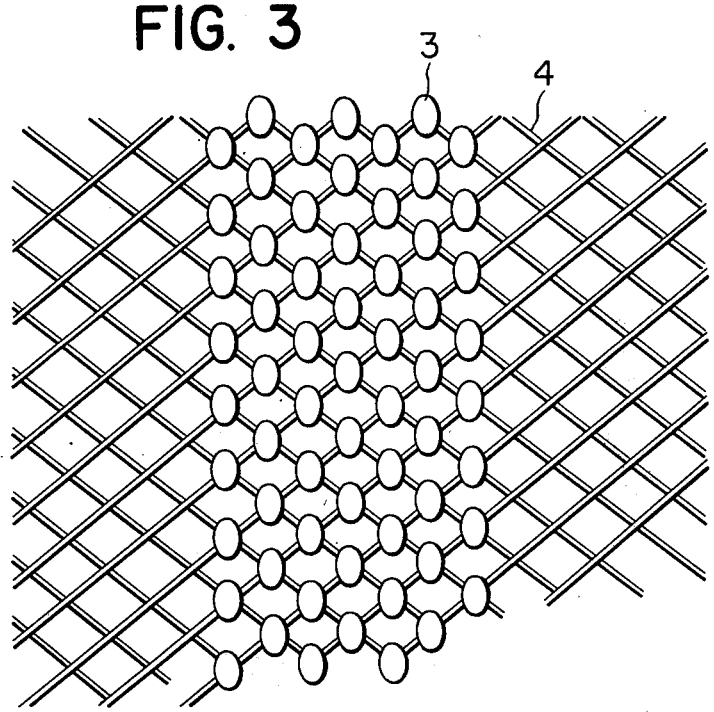

FIGS. 2 and 3 are diagrammatic plan views showing in developed fashion parts of the electrodes 3 and electrical wiring network 4 in the case in which the electrodes 3 are discontinuously arranged in the tire tread surface. In FIG. 2, the conductors forming the electrical wiring network 4 are disposed to extend in a radial direction from the shoulder portion to the bead portion, while in FIG. 3, the conductors forming the electrical wiring network 4 are disposed to intersect one another. Due to the fact that a tire is generally subject to great local deformation by the load, a discontinuous arrangement of the electrodes 3 in the tire tread surface as shown in FIGS. 2 and 3 is desirable in preventing excessive stress concentration and improving the durability of the electrodes 3.

In these cases too, at least one of the electrodes 3 must be in contact with the track during rolling engagement of the tire with the track so as to continuously receive electric power from the track. Therefore, the density of the electrodes 3 discontinuously distributed in the tire tread surface is suitably determined depending on the rigidity of the tire.

Referring to FIG. 1 again, the electrical wiring network 4 is connected to the bead wire 2 and thence to a suitable portion of the vehicle (not shown) by the electrical wiring 6. This electrical wiring 6 includes one or more electrical leads. The opening 5a bored in the rim 5 adjacent to the position of the electrical wiring 6 for passing the power supply lead therethrough is insulated by an electrical insulator and the rim 5 is also electrically insulated from the electrical wiring network 4 although not shown. In some cases, the rim 5 need not be electrically insulated from the electrical wiring network 4 depending on the state of using the tire.

Figure 4:
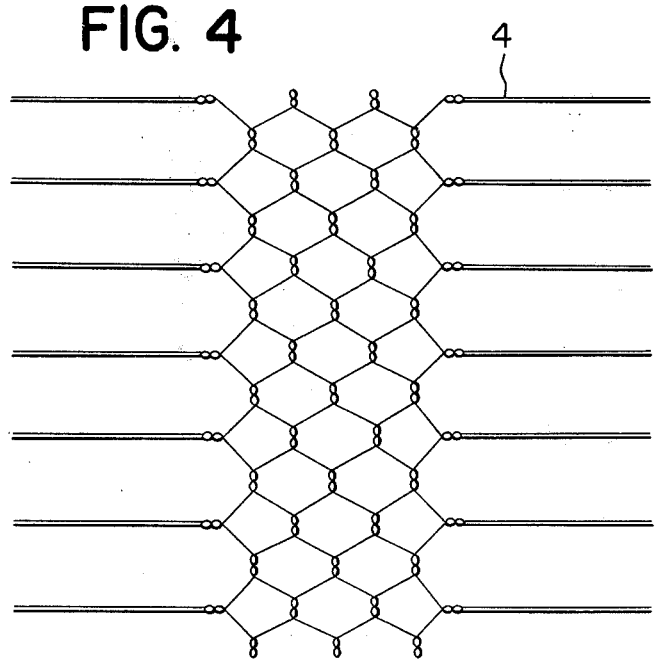

Further, although the electrical wiring network 4 is shown completely embedded in the tire walls in FIGS. 1 to 3, this electrical wiring network 4 may have an arrangement as shown in FIG. 4 and may be exposed at the outer surface of the tire side walls to similarly attain the objects of the present invention. In this case, electrodes 3 may be provided to prevent displacement of the electrical wiring network 4 and to enhance the current conductivity.

The electrical capacity of collecting current by the electrodes 3 and electrical wiring network 4 is determined by the total area of the electrodes 3 continuously or discontinuously disposed in the tire tread surface, and the capacity of wiring is determined by the electrical capacity required for current collection. Therefore, the number of conductors forming the electrical wiring network extending along the side walls of the tire is remarkably less than that of cords forming the conventional tire carcass layer although the number of such conductors is determined by the diameter of the selected conductors. However, many conductors are necessary when the electrical wiring network is used as the reinforcing layer such as the carcass layer.

Figure 5:
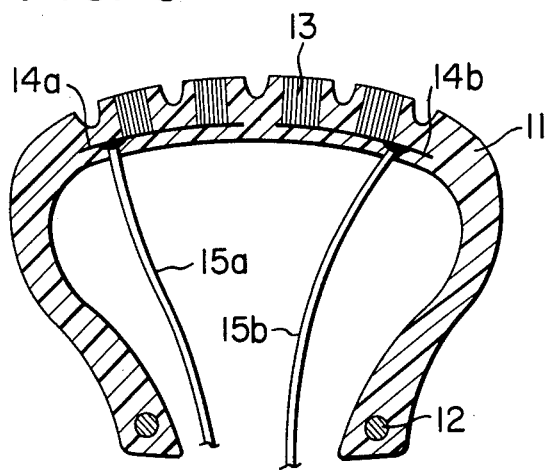
FIG. 5 is a schematic sectional view of another embodiment of the current-collecting tire according to the present invention.

FIG. 5 shows another embodiment of the present invention in which electrodes and electrical wiring are divided into a plurality of groups which are arranged in parallel with each other. Referring to FIG. 5, a current-collecting tire comprises a tire body 11 of elastomeric material, a bead wire 12 disposed in the tire body 11, and a plurality of electrodes 13 embedded in the tread portion of the tire body 11 in such a manner that one end thereof is exposed from the tire tread surface.

Figure 6:
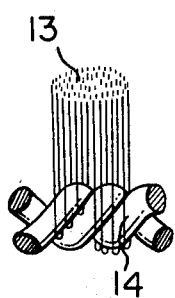
FIGS. 6 and 7 are a perspective view and a developed plan view respectively showing in detail the manner of electrical connection between electrodes and electrical wiring in FIG. 5.
Figure 7:
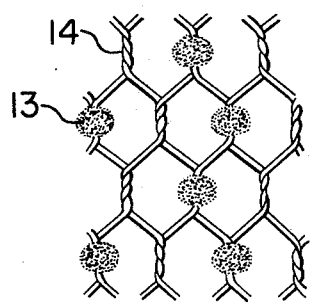

These electrodes 13 are formed by many fine wires of conductive metal as shown in FIGS. 6 and 7, and these fine metal wires are bundled to be electrically connected to conductors 14 constituting electrical wiring by, for example, twisting these conductors 14 as seen in FIG. 6. Further, these electrodes 13 are disposed discontinuously or in spaced apart relation in the tire tread surface. In lieu of this discontinuous electrode arrangement, electrodes in the form of a band may be disposed continuously or in an annular form in the circumferential direction of the tire tread portion as described with reference to FIG. 1.

All these electrodes 13 are not electrically connected to the conductors 14 of one and the same group. The conductors 14 are electrically divided into a plurality of groups (two groups in this embodiment) of conductors 14a and 14b so as to provide at least two groups of current collecting wiring, and the electrodes 13 are grouped to be electrically connected to these conductors 14a and 14b. Leads 15a and 15b are electrically connected at one end thereof to the conductors 14a and 14b respectively. These leads 15a and 15b pass through the internal cavity of the tire body to be electrically connected at the other end thereof to a suitable portion of the vehicle, for example, the axle of the vehicle. Slip rings may be disposed within the tire internal cavity so as to connect the other end of these leads 15a and 15b to the vehicle axle. This arrangement is advantageous in that frictional sounds produced by the slip rings can be remarkably attenuated due to confinement of the slip rings within the tire body and the tire can operate without any substantial noise produced inevitably by a conventional frictional current collector such as a pantograph.

Figure 8:
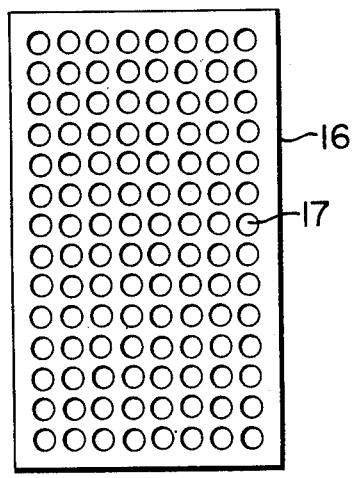
FIG. 8 is a plan view of another form of the electrical wiring connected to the electrodes.
Figure 9:
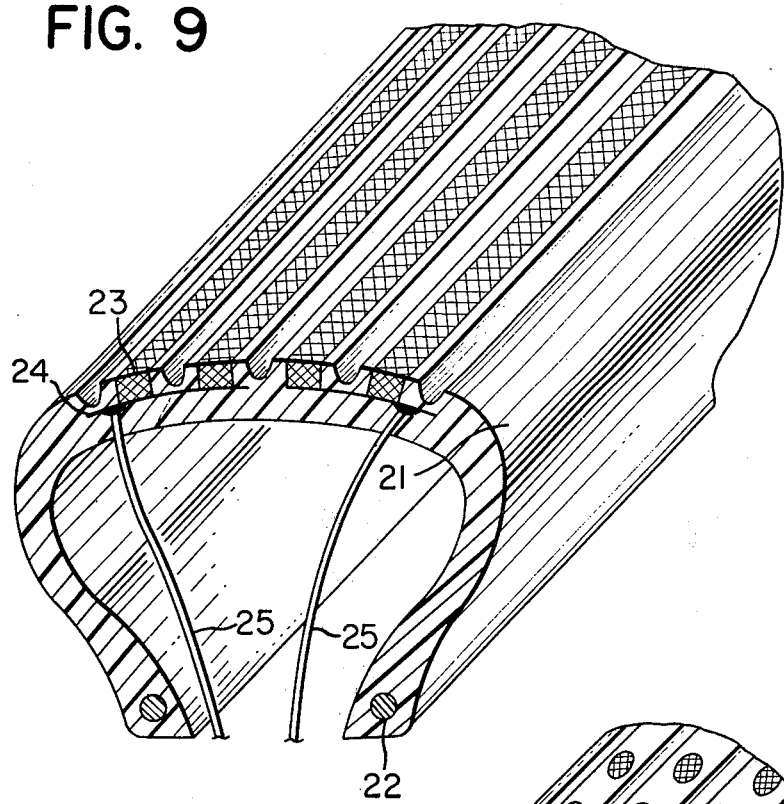
FIGS. 9 and 10 are perspective view of other embodiments of the current-collecting tire according to the present invention.
Figure 10:
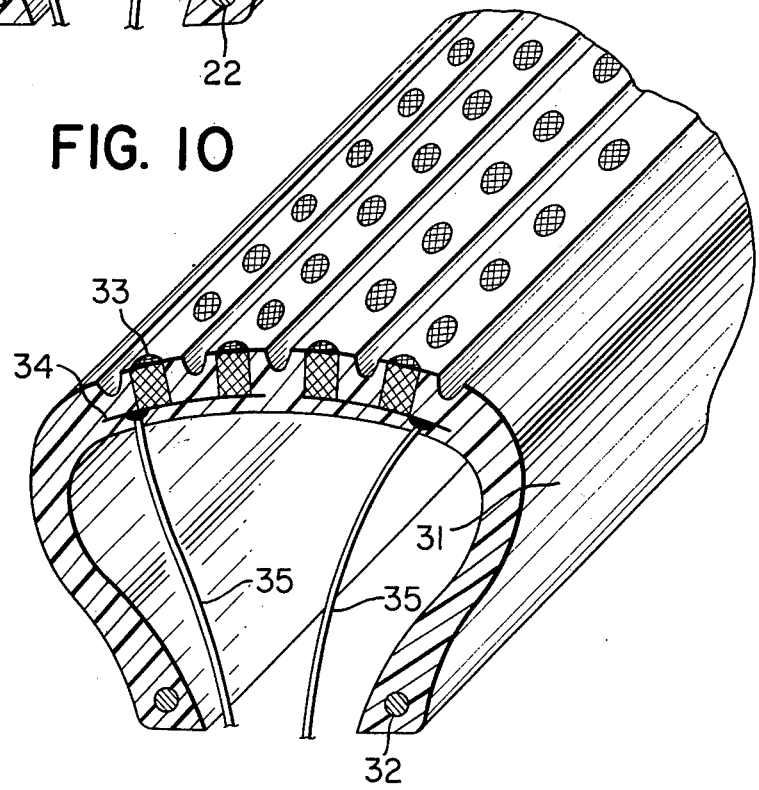

FIG. 8 shows another form of electrical wiring which replaces the arrangement shown in FIGS. 5, 6, and 7 in which the spaced current collecting electrodes 13 are connected to the conductors 14a and 14b by twisting these conductors to provide a network of electrical wiring and FIGS. 9 and 10. Referring to FIG. 8, many perforations 17 are bored in a thin sheet of metal 16 and electrodes 13 are fitted in these perforations 14 to provide electrical wiring in sheet form. This electrical wiring exhibits a function equivalent to that of the electrical wiring in network form.

As shown in FIG. 9, the current-collecting electrodes 23 may consist of the braid or ribbon made of fine metal wires or metal fibers and forming a band extending around the tire periphery. The electrode thus formed having a good flexibility, the electrode contact at the tire tread can be made very smooth. In this case, if the braid or ribbon electrodes 23 are extended further to pass through the internal cavity of the tire, the conductors and the leads can be dispensed with by the existense of such extended portions of the electrodes.

Further, in the current-collecting elastic tire shown in FIG. 10, the current-collecting electrodes 33 are constructed by metalwool-like scrambled and compacted metal wires. The compacted metal wires can be scattered over the tire tread surface to form spots thereon as shown in FIG. 10. Such arrangement is advantageous since it generates smaller noise in comparison with an arrangement of metal members on the tread, like the ice spike tire, and it contributes to good electrical contact to the power supply path.

In the current-collecting elastic tire shown in FIGS. 5, 9 and 10, a plurality of current collecting electrodes and conductors connected thereto are suitably grouped to constitute at least two current collecting wiring groups electrically connected to the vehicle, so that a single tire can meet the requirement for supply of electric power to the vehicle from at least two power sources of different kinds. This current-collecting elastic tire is therefore advantageous in that electric power can be simply and easily supplied from different power sources without requiring a power supplying and current collecting system of complex construction and large size. Further, in the current-collecting elastic tire shown in FIGS. 5, 9 and 10, the electrical wiring or leads for electrically connecting the current collecting electrodes to the vehicle pass through the internal cavity of the tire body. This tire is advantageous in that the leads do not contact other parts and are safely protected by the tire body.

Furthermore, the structure of the current collecting electrodes as shown in FIGS. 5, 9 and 10 is advantageous in that the noise produced thereby is remarkably lower than the noise generated by conventional metal pieces such as ice spikes disposed in the tire tread, and such electrodes make satisfactory electrical contact with the power supply path on the guideway.

The construction and functional effects of the tire according to the present invention are summarized as follows:

1. The tire body is made of a relatively rigid elastomeric material (having a JIS hardness of about 95). The wall thickness of the tire body is suitably designed so that the spring constant in the radial direction in the state in which no air under pressure is filled in the tire can be made equivalent to or greater than that of a conventional pneumatic tire.
2. Electrodes in continuous plate form or discontinuously spaced apart piece form, preferably in the latter form, are disposed in the tread portion of the tire body in (1).
3. Electrical wiring is connected to the electrodes in 2. and this electrical wiring extends through the internal cavity of the tire body or through the tire walls or along the outer surface of the tire side walls to be electrically connected to the vehicle.
4. In lieu of the relatively rigid elastomeric material described in (1), an elastomeric material having a hardness similar to that of rubber used presently for a conventional pneumatic tire is employed, to form the tire body.
5. Electrodes are embedded in the tread portion of the tire body in (4).
6. Electrical wiring is connected to the electrodes in (5), and the conductors constituting this electrical wiring are uniformly arranged in a high density so that the electrical wiring can serve both as an electrical path and as a reinforcing layer similar to the conventional tire carcass layer.
7. The electrodes in (2) are suitably divided into at least two groups and the electrical wiring is also grouped to provide at least two groups of electrical circuits.
8. Air under pressure is filled in the tire having the reinforcing layer formed by the electrical wiring in (6) so that the tire can be used as a pneumatic tire.

It will be understood from the foregoing detailed description that the current-collecting elastic tire according to the present invention comprises electrodes and electrical wiring of good electrical conduction disposed in the tire body, and a carefully selected elastomeric material is employed to form the tire body so that it can serve a special service as a guide wheel for a vehicle and supply required electric power to the vehicle.

What is claimed is:

1. A current-collecting and power transmitting elastic tire for a vehicle comprising a non-pneumatic tire made of elastomer and being of toroidal shape in radial section and including a tire body, a plurality of electrodes of conductive material embedded in the tire body and extending in the circumferential direction of the tire tread portion, said electrodes being exposed at one end thereof from the tire tread surface and being electrically connected at the other end thereof to electrical wiring extending to a radially inner portion of the tire for connection to a suitable portion of the vehicle, said electrodes being suitably grouped and adapted to be electrically connected to the vehicle by said electrical wiring so as to constitute at least two separate current transmitting circuits, each of which includes a flexible annular conductive band extending circumferentially of the tire and positioned in the tire tread portion.

2. A current-collecting and power transmitting elastic tire for a vehicle comprising a non-pneumatic tire made of elastomer and being of toroidal shape in radial section and including a tire body, a plurality of electrodes of conductive material embedded in the tire body and extending in the circumferential direction of the tire tread portion, said electrodes being exposed at one end thereof from the tire tread surface and being electrically connected at the other end thereof to electrical wiring extending to a radially inner portion of the tire for connection to a suitable portion of the vehicle, said electrical wiring being disposed to extend along the outer surface of the side walls of said tire body.

* * * * *